United States Patent [19]

Mihic et al.

[11] 3,812,560
[45] May 28, 1974

[54] TOOL HOLDER ASSEMBLY
[75] Inventors: Wlajko Mihic; Stig Ove Back, both of Gavle, Sweden
[73] Assignee: Mircona AB, Gavle, Sweden
[22] Filed: Feb. 27, 1973
[21] Appl. No.: 336,356

Related U.S. Application Data
[63] Continuation of Ser. No. 778,226, Nov. 22, 1968, abandoned.

[52] U.S. Cl. ................................................. 29/96
[51] Int. Cl. ............................................ B26d 1/00
[58] Field of Search ............... 29/95, 96, 97; 82/36; 408/186

[56] References Cited
UNITED STATES PATENTS
1,222,178  4/1917  Browand .................... 82/36 R

| | | | |
|---|---|---|---|
| 2,127,231 | 8/1938 | Morris | 29/96 |
| 2,293,006 | 8/1942 | Luers | 29/96 |
| 3,220,089 | 11/1965 | Hammers | 29/96 |
| 3,408,885 | 11/1968 | Mendenhall | 82/36 R |

*Primary Examiner*—Leonidas Vlachos
*Attorney, Agent, or Firm*—Waters, Roditi, Schwartz & Nissen

[57] ABSTRACT

A tool holder comprises a body to which is attached a supporting plate for a cutting member. The supporting plate is attachable to the body in two different positions and supports cutting members in two corresponding different positions in which the cutting members are respectively at the upper side and the lower side of the body.

5 Claims, 3 Drawing Figures

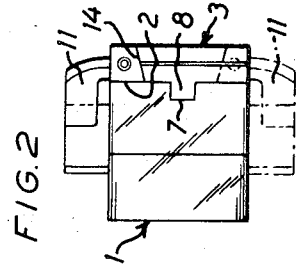
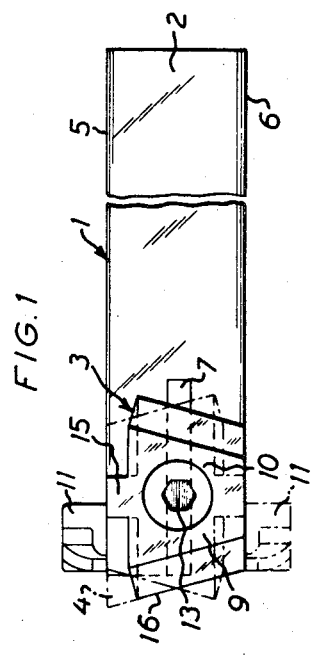
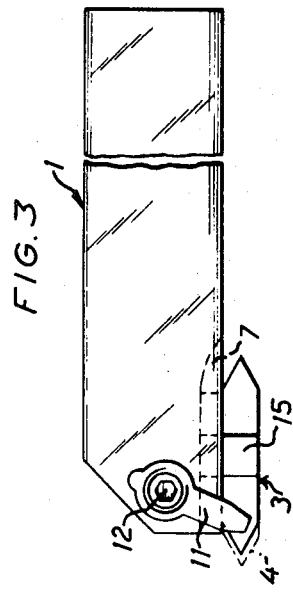

TOOL HOLDER ASSEMBLY

CROSS RELATED APPLICATION

This application is a continuation of application Ser. No. 778,226, copending herewith and filed Nov. 22, 1968 and now abandoned.

The invention relates to a tool holder assembly and particularly to a tool holder assembly in which cutting members can be supported in one of two positions. As a consequence the tool holder assembly can be used in both right-hand and left-hand design.

According to the invention a tool holder assembly is provided which comprises an elongate body having a flat side surface, cutting members, a supporting plate attachable to said body at said flat side surface in first and second positions, said supporting plate having a surface for supporting the cutting members in two different positions on said body corresponding to the two positions of the supporting plate, and means for clamping the cutting members against said surface of the supporting plate in both positions of said plate, one of said body and plate having a groove and the other including a projection engageable in said groove to mount the plate on the body in said two positions.

The groove and projection are so shaped and positioned that the plate is turned 180° in moving from one position to the other.

The invention will now be more fully described with reference to the accompanying drawing which illustrates one embodiment of a tool holder assembly given by way of example.

In the drawing:

FIG. 1 is a side view of the tool holder assembly;

FIG. 2 is a front view of said assembly; and

FIG. 3 is a top plan view of the assembly.

The drawing shows a tool holder assembly which comprises an elongate body 1 of rectangular, and preferably square cross-section. On a side face 2 of the body 1 a supporting plate 3 is mounted for the support of a cutting member 4. The supporting plate 3 is mountable on the body 1 so that one cutting member 4 can be placed at the upper side 5 and another at the lower side 6 of the body 1. More specifically, the supporting plate 3 can be mounted on body 1 in one of two positions 180° apart from one another. In both of these two positions the supporting plate 3 must be well secured to the body 1. For this securing of the supporting plate 3, the body 1 has a longitudinal groove 7 in side face 2 and a corresponding projection 8 of the supporting plate is adapted to engage in groove 7. In the embodiment illustrated, the projection 8 is a spline conforming to the groove 7. In another embodiment the projection could be constituted of a number of parts conforming to groove 7. For reasons of symmetry of mounting of the cutter member 4, the groove 7 is positioned midway between the upper side 5 and the lower side 6 of the body 1.

As will appear most clearly from FIG. 1, the supporting plate 3 is formed by two identical portions 9 and 10 which are symmetrical about a vertical axis passing through the center of plate 3. When positioned at the upper side of the body 1, a cutting member 4 cooperates with portion 9, and when positioned at the lower side 6 of the body 1 a member 4 cooperates with portion 10. The latter position is shown by chain-dotted lines in FIGS. 1 and 2.

A clamping element 11 is provided for securing the cutting member 4 on the body 1. The clamping element 11 is replaceably engageable with either the upper side 5 or the lower side 6 of the body 1. The clamping element 11 is fixed to body 1 by a bolt 12 which is engaged in a hole in the body 1. The supporting plate 3 is secured to body 1 by means of a bolt 13 which is screwed into the threaded hole in the body.

As appears from the drawing, the supporting plate 3 provides a very good support for the cutting member 4 without obstructing the cutting operation. The cutting member 4 is supported by an inwardly inclined surface 14 of plate 3. A stud 15 is provided at the middle of the supporting plate 3 at surface 14. The front edge 16 has substantially the same shape as the cutting member 4, as seen in FIG. 3, and the apex of edge 16 projects at least partly beyond the body 1, as seen in FIG. 3.

With the support surface for the cutting member inclined as shown at 14, it obviously becomes necessary to employ two different cutting members for the different positions of plate 3. The shape of the cutting members will be readily evident to those skilled in the art upon consideration of FIGS. 1 and 2 where the space for the two different cutting members is shown.

Although a single embodiment of the invention has been described above and illustrated in the drawing, those skilled in the art will readily realize that various modifications can be made within the scope of the invention as defined by the appended claims.

We claim:

1. A tool holder assembly comprising an elongate body having upper and lower sides and a flat side surface extending at a right angle between said upper and lower sides, cutting means, a supporting plate, means for attaching said supporting plate to said body at said flat side surface in first and second positions, said supporting plate having two surfaces selectively available for supporting said cutting means at the upper or lower sides of said body depending on the position of the supporting plate, said surfaces of said supporting plate extending obliquely to said side face of the body, said cutting means comprising a cutting member having a corresponding oblique face which engages the oblique surface of the plate in said first position and/or a second cutting member having a corresponding oblique face which engages the second surface of the plate in the second position, and means on and movable between the upper and lower sides of said body for clamping said cutting means against the respective one of said surfaces of the supporting plate in said first and second positions of said plate, said body having a groove midway between said upper and lower sides and the supporting plate including a projection engageable in said groove to mount the plate on the body in said two positions.

2. A tool holder as claimed in claim 1, wherein said body has upper and lower flat surfaces, said cutting means having an outer surface which is flush with said upper or lower flat surfaces in one of the two positions of the supporting plate.

3. A tool holder as claimed in claim 1 comprising a bolt for securing the supporting plate to the body in said two positions.

4. A tool holder as claimed in claim 1 wherein each said cutting means has a frontal portion of pointed shape projecting beyond the body, said supporting plate having a frontal surface of similar shape as the cutting means and extending in continuation thereof.

5. A tool holder as claimed in claim 1 wherein said plate is symmetrical about a plane perpendicular to said surfaces of said supporting plate, said plate having mirror image portions on opposite sides of said plane, each of said portions including one of the surfaces of the supporting plate.

* * * * *